UNITED STATES PATENT OFFICE.

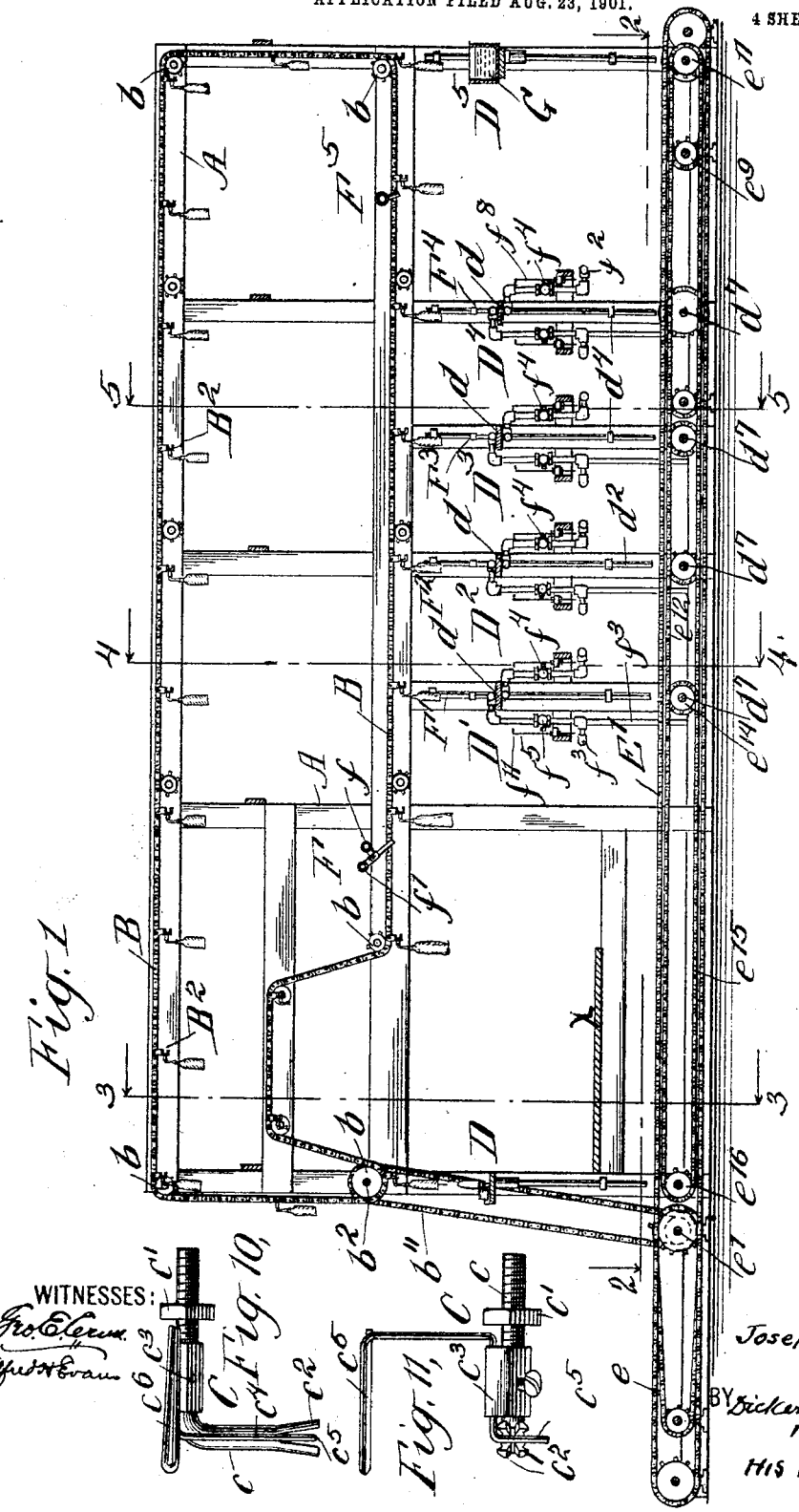

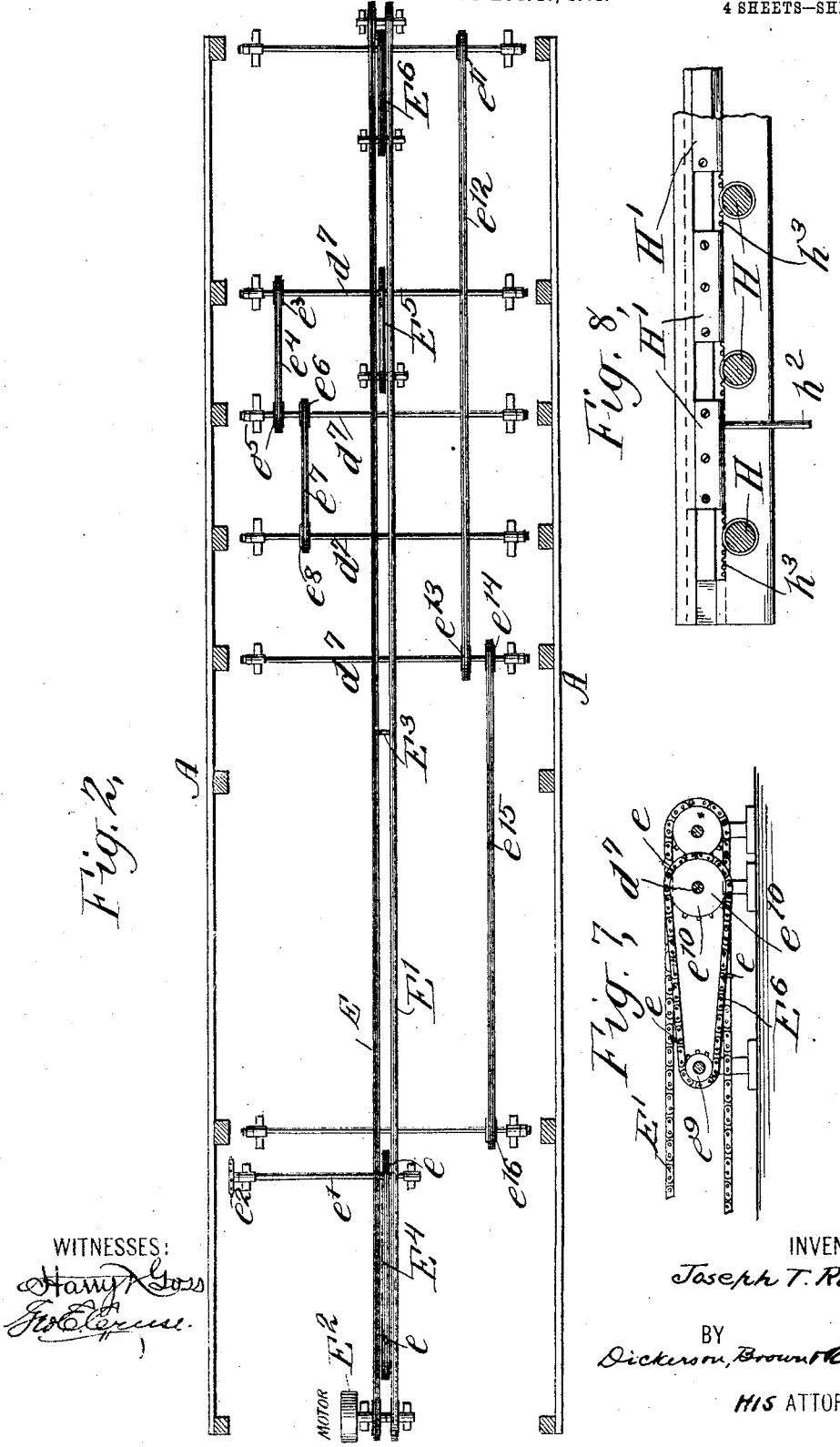

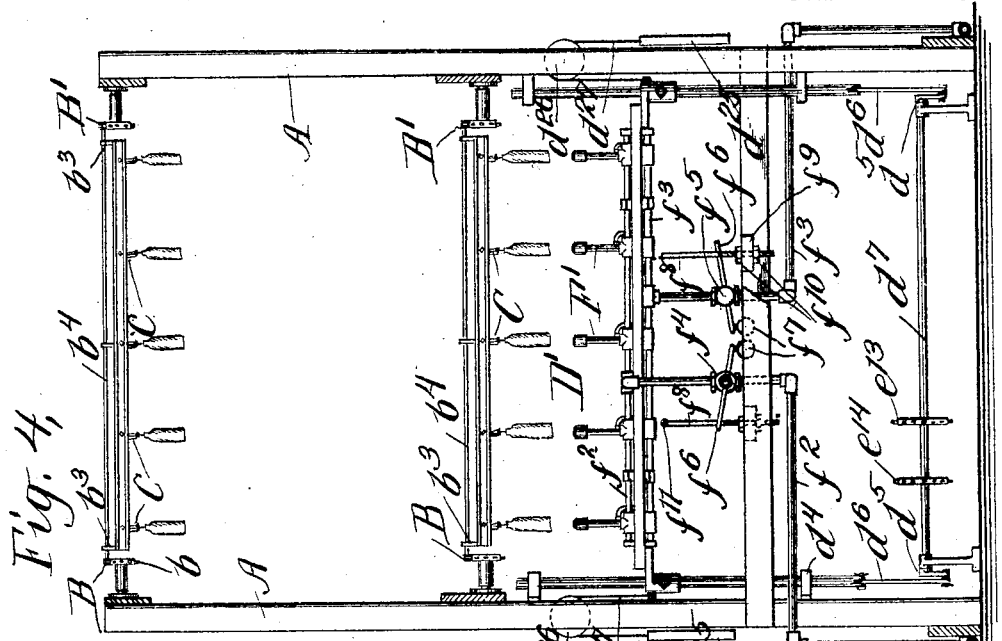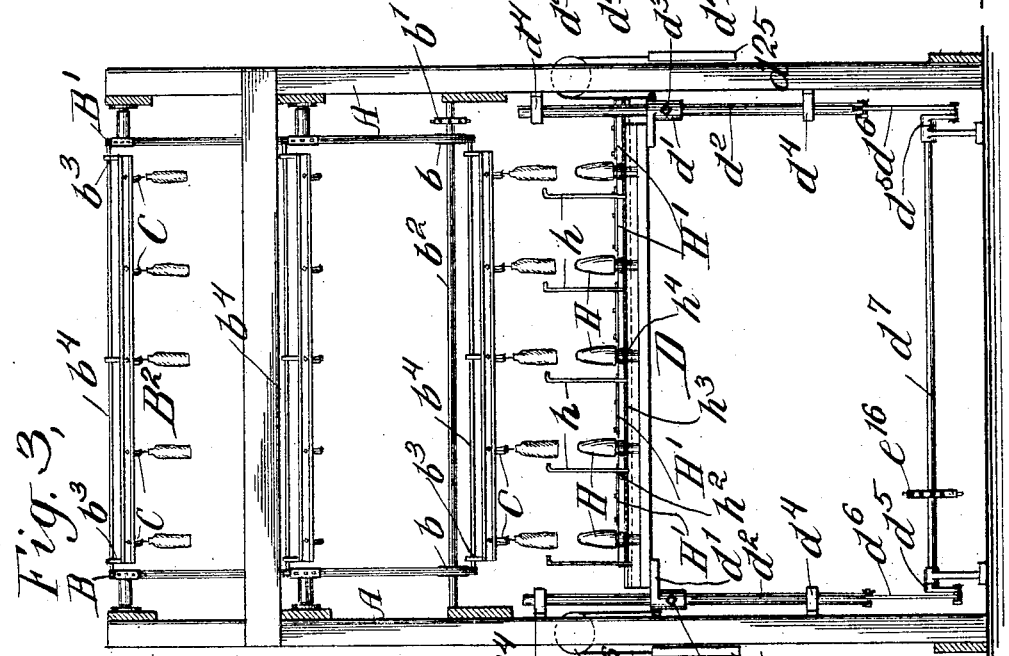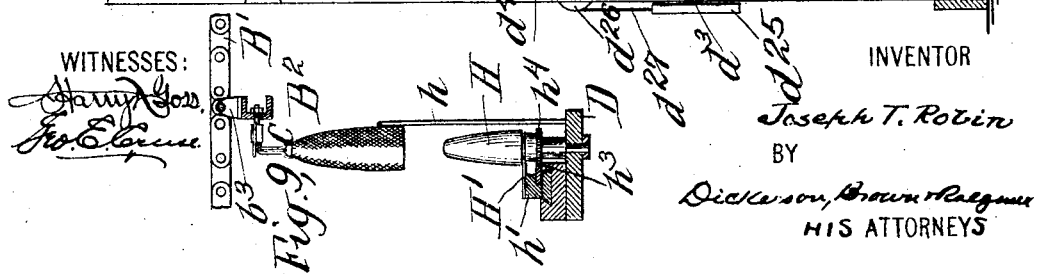

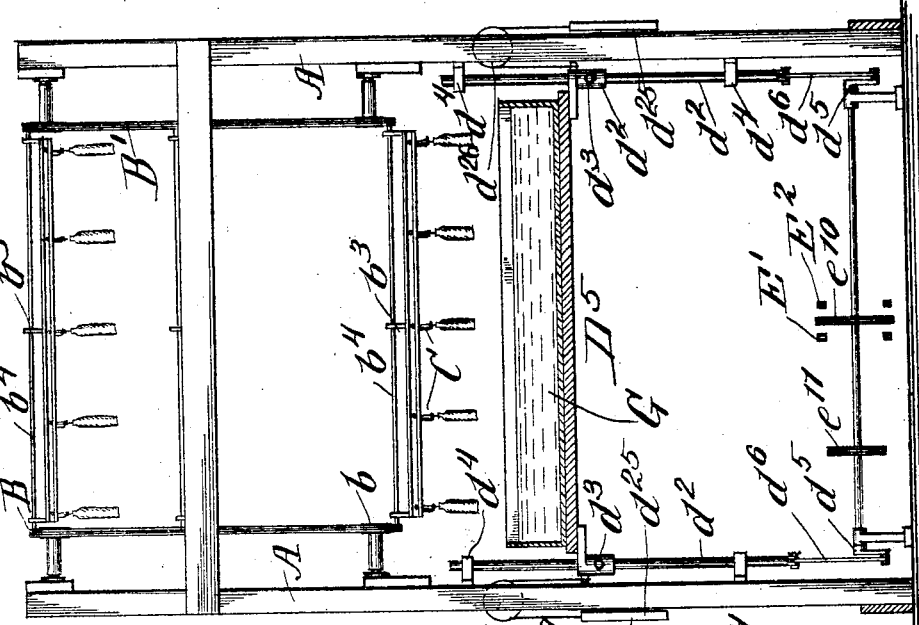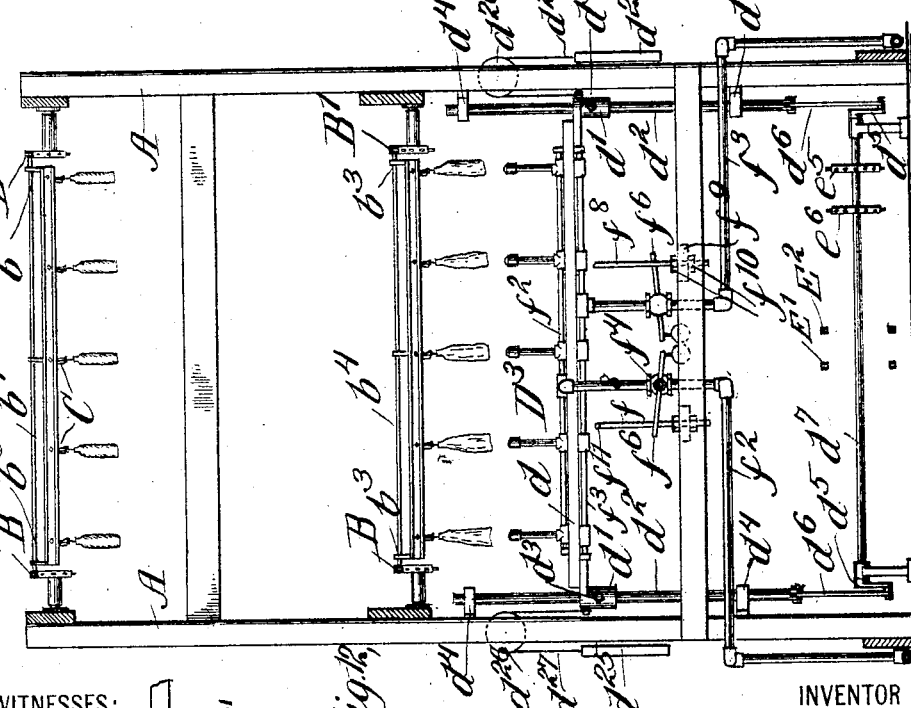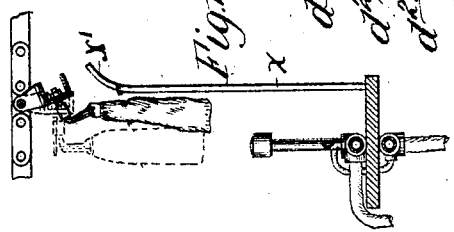

JOSEPH T. ROBIN, OF NEW YORK, N. Y.

MACHINE FOR TREATING IMPREGNATED FABRICS TO PRODUCE INCANDESCENT GAS-MANTLES.

No. 805,325.  Specification of Letters Patent.  Patented Nov. 21, 1905.

Application filed August 23, 1901. Serial No. 72,994.

*To all whom it may concern:*

Be it known that I, JOSEPH T. ROBIN, a citizen of the United States, residing in the borough of Manhattan, city, county, and State of New York, have invented certain new and useful Improvements in Machines for Treating Impregnated Fabrics to Produce Incandescent Gas-Mantles, of which the following is a specification.

My invention relates to a machine for treating fabrics in tubular or stocking form which are impregnated with a substance or substances, such as rare earthy salts, to produce incandescent gas-mantles.

I will describe such a machine embodying my invention, and then point out the novel features thereof in the claims.

In the accompanying drawings, Figure 1 is a view, partly in elevation and partly in vertical longitudinal section, of a machine embodying my invention. Fig. 2 is a view, partly in top plan and partly in transverse section, of mechanisms for intermittently operating parts comprised in the machine. Fig. 3 is a view, partly in elevation and partly in transverse vertical section, taken on the line 3 3 of Fig. 1. Fig. 4 is a view similar to Fig. 3 and taken on the line 4 4 of Fig. 1. Fig. 5 is a view similar to Fig. 3 and taken on the line 5 5 of Fig. 1. Fig. 6 is a view, partly in elevation and partly in vertical transverse section, of that end of the machine at the right of Fig. 1. Fig. 7 is a detail view of a portion of the mechanism for intermittently operating parts of the machine. Fig. 8 is a detail view of a portion of a mantle-trimming mechanism. Fig. 9 is a view, partly in vertical section, of the mantle-trimming mechanism. Fig. 10 is a detail view of a hook for suspending the structure during its travel in the machine. Fig. 11 is a bottom plan view of Fig. 10. Fig. 12 is a detail view, partly in section, of table or support and a centering means.

Similar letters of reference designate corresponding parts in all of the figures.

A represents a framework upon which the several parts comprised in the machine may be supported or suspended, the framework being of such construction and material as will best support and suspend the several parts comprised in the machine.

B B' represent a pair of endless sprocket chains or belts, and $B^2$ a plurality of carriers in the form of bars extending between the two chains. The belts and bars taken together constitute a traveling support. The two chains or belts B B' pass about sprockets or pulleys $b$, which serve to guide the chains in their travel.

$b^2$ represents a shaft on which two sprockets $b$ are mounted. This shaft is provided with a sprocket $b'$, about which a chain $b^{11}$ passes. The chain $b^{11}$ is driven from a mechanism which is intermittently operated, thereby giving an intermittent movement to the two chains and bars $B^2$.

Each carrier-bar $B^2$ is suspended by means of arms $b^3$ from a rod $b^4$, the ends of which are removably held in the chains B B'. Each bar $B^2$ is provided with a number of suspending devices C. (See Figs. 10 and 11.) Each suspension device comprises an arm or other support $c$, here shown as being in the form of a right angle, screw-threaded at one of its ends to receive a nut $c'$, and provided at its other end with forked portions $c^2$. The screw-threaded portion of the arm is passed through the bar $B^2$, and it is held in this position by the nut $c'$. Secured upon the arm $c$ is a bracket $c^3$, carrying a hook $c^4$. One end of the hook $c^4$ extends through one of the forks of the portion $c^2$ of the arm $c$, as indicated at $c^5$, and its other end portion extends upwardly from the bracket $c^3$, as indicated at $c^6$. The end $c^6$ is adapted to be engaged by a rod $h$, carried by a vertically-reciprocating table or support D, and the engagement of the end $c^6$ by the rod causes the hook $c^4$ to rock in the bracket $c^3$ and to have its end $c^5$ disengaged from the usual suspending-loop on an incandescent mantle.

D, D', $D^2$, $D^3$, $D^4$, and $D^5$ represent tables or supports which are capable of being moved vertically. The table D is provided with mechanism for trimming the treated impregnated fabrics and for removing them from the carrier-bars B. The tables D', $D^2$, $D^3$, and $D^4$ carry the burners employed to treat the impregnated fabrics, while the table $D^5$ carries a tank containing a dipping solution.

Each table D D', &c., comprises a shelf $d$, the ends of which are fastened to brackets $d'$. The brackets $d'$ are adjustably fixed on vertically-arranged rods $d^2$ by means of set-screws $d^3$. Each bracket comprises a sleeve-like portion through which a rod $d^2$ extends, and each rod is guided in brackets $d^4$, secured to the framework. The rods of each table are connected by pitmen $d^6$ to cranks $d^5$, provided on a shaft $d^7$. It will be seen, therefore, that on each complete revolution of each shaft $d^7$ the tables D D', &c., will be raised and lowered. In the present instance each shaft is given a half-revolution to raise its table, and after awhile it is given another half-revolution to lower its table.

The several shafts $d^7$ may be rotated to raise and lower all of the tables or supports D D', &c., simultaneously or successively, as desired. I prefer to raise certain tables—as, for example, $D^2$, $D^3$, and $D^4$—at one time and tables D, D', and $D^5$ at another time. The mechanism for rotating the several shafts $d^7$ and the shaft $b^2$ is intermittently operated and may be of any arrangement to accomplish this. The mechanism here employed is shown more particularly in Figs. 1 and 2 and consists of the following parts: Extending the entire length of the framework A are a pair of endless sprocket chains or belts E E', which are continuously driven from a suitable motor $E^2$. Intermediate of the chains E E' are cross-bars $E^3$, which during the movement of the chains E E' engage with and operate other mechanisms—as, for example, chains $E^4$, $E^5$, and $E^6$, each of which chains is provided with one or more projections $e$ with which the bars $E^3$ engage. It is obvious, therefore, that the frequency of operation of each of the chains $E^4$, $E^5$, and $E^6$ may be regulated by the length of the chains E E' or by the number of bars $E^3$.

Referring now to the chain $E^4$, which operates the belts or chains B B', it passes around an idler-sprocket and around a sprocket carried by the shaft $e'$. The shaft $e'$ carries a sprocket $e^2$, around which the chain $b^{11}$ passes. Referring now to the chain $E^5$, it passes around an idler-sprocket and around a sprocket fixed to the shaft $d^7$ of the table $D^4$. This shaft $d^7$ is provided with a sprocket $e^3$, around which a sprocket-chain $e^4$ passes, which chain also passes around a sprocket $e^5$, fast on the shaft $d^7$ of table $D^3$. The shaft $d^7$ of table $D^3$ is provided with a sprocket $e^6$, around which a sprocket-chain $e^7$ passes, which chain also passes around a sprocket $e^8$, fast on the shaft $d^7$ of table $D^2$. Thus it will be seen that upon the operation of chain $E^5$ the three shafts $d^7$ of tables $D^2$, $D^3$, and $D^4$ will be rotated to raise and lower the tables $D^2$, $D^3$, and $D^4$. Referring now to chain $E^6$, (see Fig. 7,) it passes about an idler-sprocket $e^9$ and about a sprocket $e^{10}$, fast on the shaft $d^7$ of table $D^5$. This shaft has fixed to it (see Fig. 2) a sprocket $e^{11}$, about which a sprocket-chain $e^{12}$ passes, which chain also passes about a sprocket $e^{13}$, fast on the shaft $d^7$ of table D'. The shaft $d^7$ of table D' has fixed to it a sprocket $e^{14}$, around which a sprocket-chain $e^{15}$ passes, which chain also passes about a sprocket $e^{16}$, fast on the shaft $d^7$ of table D. Thus it will be seen that upon the operation of chain $E^6$ the three shafts $d^7$ of tables D, D', and $D^5$ will be rotated to raise and lower said tables. To assist in the raising and lowering of the several tables D D', &c., each table is provided with a pair of counterbalance-weights $d^{25}$, which are connected with chains $d^{27}$, passing over pulleys $d^{26}$, journaled at the top of the framework A. It is obvious that independent motors may be supplied to raise and lower each table and operate the chains B B'. As herein illustrated, the chains $E^4$, $E^5$, and $E^6$ constitute separate power mechanisms operated from a common power mechanism E E'.

In the operation of the machine an attendant on the platform X places impregnated fabrics in the substantial shape of stockings upon the hooks of the carrier-bars as they are intermittently brought into position. The stockings at this time consist of the fabric and the earthy salts with which the fabric is impregnated. As the stockings are moved along they come adjacent a series of burners F, one burner being provided for each stocking. These burners are carried by a gas-pipe $f'$, which is a branch of a main supply-pipe. (Not shown.) $f$ represents a compressed-air-supply pipe forming a branch of a main supply. The air, in connection with the gas, forms a blast which is necessary to heat the salts of the stocking to a high enough degree to have the fabric burned away. The stockings are held adjacent these burners until the fabric is destroyed, after which the resultant structure, which consists of a network of the salts, is brought by the carrier-bars to the burners F', $F^2$, $F^3$, and $F^4$ in succession, which burners are supported on the tables D', $D^2$, $D^3$, and $D^4$, respectively. The burners F' are for the purpose of heating the structure to such a high temperature as to cause an oxidation of the salts. A preliminary shaping of the structure is also had at these burners, for after the fabric has been destroyed the structures have approximately the shape shown in Fig. 12 —that is to say, they have an irregular surface. The burners $F^2$, $F^3$, and $F^4$ are for hardening the structures and for giving the final shape to them. $F^5$ represents jets for air which are located adjacent the path of travel of the carrier-bars and are for the purpose of cooling the carrier-bars and their suspending device.

The principal purpose of using a plurality of sets of burners is that the action of the machine may be quick. Any number of sets of burners may be used.

The burners comprised in the several sets F' $F^2$, &c., are Bunsen burners and compressed air is used in connection therewith, first, to heighten the effect of the flame, and, second, to give shape to the structures. The several gas-pipes $f^2$ and the several compressed-air pipes $f^3$ may be connected with a supply-pipe common to all burners and jets comprised in the machine. The individual pipes $f^2$ $f^3$ on each table are separately controlled by valves $f^4$ $f^5$, respectively. The valves $f^4$ $f^5$ are automatically opened and closed, the means for accomplishing this being operated by the table as it is raised and lowered. The gas and air valves are turned on gradually until each reaches its full open position, in which position the table is fully raised, and each valve is gradually closed when the table is lowered. In order that each structure will be properly centered over its burner, a centering means is provided for each table $D'$ $D^2$, &c. As here shown, such means may consist of a vertically-arranged rod $x$, having a curved end $x'$, which engages with the carrier-bar above its table. (See Fig. 12.) Any other means for accomplishing the same purpose may be employed.

The means here shown for opening and closing the valves $f^4 f^5$ will now be described. As the same arrangement of parts is used on each table, the following description of one will apply equally to all. Each valve $f^4 f^5$ is provided with an operating-stem $f^6$, at one end of which is a weight $f^7$. $f^8$ represents a rod adjustably held in a support $f^9$, rigid with the framework, by means of nuts $f^{10}$. This rod is provided with a head $f^{11}$, which is formed by bending the end of the rod, which head engages with the operating-stem to cause the valve to open when the table carrying the valve is raised. On the lowering of the table the weight $f^7$ tends to close the valve. Flexible connections are provided in the several gas and air pipes $f^2 f^3$ in order that the tables may be raised and lowered. The flexible connections may conveniently consist of turn-couplings between the several sections comprised in these said pipes. By having independent rods $f^8$ for each valve separate adjustments may be had for the air and gas. This is done by shifting the position of the rod to change the time of opening of the valve.

After the structures have been hardened and the carrier-bars and suspending devices cooled the carrier-bars are successively brought into position over the table $D^5$. The table $D^5$ carries a tank or receptacle G containing a stiffening solution, which may be collodion. The table $D^5$ rises at the proper moment and brings the receptacle G to such position as to cause an immersion of the structures.

After the structures are dipped they are carried along the top of the framework to permit them to dry. The dried structures are then brought into position over the table D. This table carries a plurality of mandrels H and a plurality of knives H'. As the table D is raised a series of vertical rods $h$ carried thereby (one for each suspending device C) engages with the ends $c^6$ of the hooks $c^4$ to disengage the hooks from the loops and permit the structures to fall onto the mandrels H. The several knives H' are carried by a bar $h'$, which is reciprocated by hand, a handle $h^2$ being provided for this purpose. The bar $h'$ is provided with rack-teeth $h^3$, which mesh with pinions $h^4$, carried by the mandrels. Then the bar is reciprocated longitudinally, the mandrels are rotated, and at the same time the ends of the structures are trimmed by the knives H'. The trimmed structures are then removed from the formers H for packing.

What I claim as my invention is—

1. In a machine for treating a structure to produce an incandescent mantle originally consisting of a fabric impregnated with a suitable substance, the combination of a traveling support, a series of treating devices for the structure, and means for intermittently presenting the structure for treatment, said means comprising a continuously-moving chain and an independent chain geared with the traveling support and moved at intervals by the continuously-moving chain.

2. In a machine for treating a structure to produce an incandescent mantle originally consisting of a fabric impregnated with a suitable substance, the combination of a plurality of endless chains having means for supporting the structure, means consisting of a continuously-operating chain carrying bars, and a single chain having projections with which the bars engage for intermittently operating said single chain, and a series of treating devices, each adapted to perform a step in the manufacture of the incandescent mantle.

3. In a machine for treating a structure to produce an incandescent mantle originally consisting of a fabric impregnated with a suitable substance, the combination of a traveling support for said structure, mechanism for intermittently moving said traveling support, means for destroying the fabric and for causing an oxidation of the said substance, other means for hardening the oxidized substance and for shaping the structure, which means are raised to and lowered from the traveling support, a device for carrying a stiffening solution also adapted to be raised to and lowered from the traveling support, and other means for trimming the structure and removing it from the traveling support.

4. In a machine for treating a structure to produce an incandescent mantle originally consisting of a fabric impregnated with a suitable substance, the combination of a traveling support comprising a plurality of carrier-bars from each of which a structure is suspended, a series of devices each adapted to perform a step in the manufacture of the incandescent mantle, and means for moving said traveling support to present the structure to said devices successively and for moving the devices to and away from the carrier-bars.

5. In a machine for treating a structure to produce an incandescent mantle originally consisting of a fabric impregnated with a suitable substance, the combination of a traveling support, a series of devices for treating the structure to produce an incandescent mantle, movable tables on which some of said devices are mounted and means for intermittently moving said traveling support and for raising and lowering the said movable tables toward and away from the traveling support, said means comprising a continuously-operating chain having bars, a series of separate chains each having projections with which the said bars engage, and suitable connections between said individual chains and the traveling support and movable tables.

6. In a machine for treating structures to produce incandescent mantles originally consisting of fabrics impregnated with a suitable substance, the combination of a traveling support, comprising a plurality of carrier-bars for the structures, a series of treating devices, each adapted to perform a step in the manufacture of the incandescent mantle, and means for intermittently moving the traveling support to present the structures to the treating devices successively and for moving each of the devices to and away from each carrier-bar, comprising a continuously-moving endless chain carrying a number of bars and a plurality of independent chains each carrying a number of projections which are engaged by said bars.

7. In a machine for treating a structure to produce an incandescent mantle originally consisting of a fabric impregnated with a suitable substance, the combination of a traveling support comprising a plurality of carrier-bars from each of which a structure is suspended, a series of treating devices each adapted to perform a step in the manufacture of the incandescent mantle comprising movable tables, a pair of rods connected with each movable table, and means for moving each of said tables to and from the structures, said means consisting of a shaft carrying cranks, which cranks are connected to the rods of its table, and gearing for rotating the shafts intermittently.

8. A machine for treating structures to produce an incandescent mantle originally consisting of fabrics impregnated with suitable substances, having endless chains, bars connected with and extending between the chains, a series of suspension devices carried by said bars, in combination with a series of treating devices, each adapted to perform a step in the manufacture of the incandescent mantles and comprising movable tables carrying treating devices arranged to move toward and away from the suspension devices.

9. In a machine for treating structures to produce incandescent mantles originally consisting of fabrics impregnated with suitable substances, the combination of a plurality of endless chains, carrier-bars connected with and extending between the chains and having means for suspending the structures, means for intermittently moving the chains, and a series of treating devices each adapted to perform a step in the manufacture of the incandescent mantles.

10. In a machine for treating a structure to produce an incandescent mantle originally consisting of fabric impregnated with a suitable substance, the combination of chains, means for intermittently moving the said chains, rods intermediate said chains, carrier-bars for the structure hung from said rods, and a series of treating devices, each adapted to perform a step in the manufacture of the incandescent mantle.

11. In a machine for treating a structure to produce an incandescent mantle originally consisting of a fabric impregnated with a suitable substance, the combination of a traveling support, a suspension device for the said structures carried by the traveling support and comprising an arm and a pivoted hook which coacts with said arm, and a series of treating devices each adapted to perform a step in the manufacture of the incandescent mantle.

12. In a machine for treating a structure to produce an incandescent mantle originally consisting of a fabric impregnated with a suitable substance, the combination of a plurality of endless chains, means for intermittently moving said chains, rods extending between the chains, carrier-bars pivotally hung from each rod, suspension devices carried by each of said bars, each suspension device comprising an arm and a pivoted hook which coacts with said arm, and a series of treating devices, each adapted to perform a step in the manufacture of the incandescent mantle.

13. In a machine for treating a structure to produce an incandescent mantle originally consisting of a fabric impregnated with a suitable substance, the combination of a plurality of endless chains, means for intermittently moving said chains, means connected therewith for suspending the structure, a suspension device for the structure supported by said means, comprising an arm and a pivoted hook which coacts with said arm, a series of treating devices each adapted to perform a step in the manufacture of the incandescent mantle, a trimming mechanism, and means carried by said trimming mechanism which engage with the said hook for moving the hook on its pivot and disengaging it from the structure whereby the structure will drop into position to be acted upon by the trimming mechanism.

14. In a machine for treating structures to produce incandescent mantles originally consisting of fabrics impregnated with suitable substances, the combination of a traveling support comprising carrier-bars and suspension devices, a series of treating devices, and means comprised in said devices which engage with the carrier-bars for centering them in order to properly present the structures for treatment.

15. In a machine for treating structures to produce incandescent mantles originally consisting of fabrics impregnated with suitable substances, the combination of a plurality of chains, means for intermittently moving said chains, rods intermediate the chains, carrier-bars pivotally hung from said rods, suspension devices for the structures provided on said carrier-bars a series of treating devices to which the bars are moved comprising movable tables, and means carried by each movable table for centering the carrier-bar adjacent to it in order to properly present the structure to the treating device.

16. In a machine for treating a structure to produce an incandescent mantle originally consisting of a fabric impregnated with a suitable substance, the combination of a traveling support, a plurality of carrier-bars connected therewith, means for intermittently moving the traveling support, a series of treating devices each adapted to perform a step in the manufacture of the incandescent mantle comprising movable treating devices, burners comprised in said devices, a gas-supply and an air-supply for such burners, a valve for separately controlling the air-supply and the gas-supply of the burners comprised in the movable treating devices, means for moving said movable treating devices toward and away from the carrier-bars, and means for opening and closing the valves of the air-supply and gas-supply of the movable treating devices.

17. In a machine for treating a structure to produce an incandescent mantle originally consisting of a fabric impregnated with a suitable substance, the combination of a plurality of endless chains, means for intermittently moving said endless chains, means connected therewith for suspending the structure, a series of treating devices each adapted to perform a step in the manufacture of the incandescent mantle, and a mantle-trimming mechanism, said mechanism comprising a mandrel, a knife for the mandrel and a bar carrying said knife and in engagement with the mandrel, which bar is adapted to be reciprocated and in its reciprocation to rotate the mandrel.

18. In a machine for treating structures to produce incandescent mantles originally consisting of fabrics impregnated with suitable substances, the combination of a traveling support having means for suspending a plurality of structures, means for intermittently moving said traveling support, a series of treating devices comprising movable tables, means for raising and lowering the movable tables, and counterbalance-weights connected with such movable tables.

19. In a machine for treating structures to produce incandescent mantles originally consisting of fabrics impregnated with a suitable substance, the combination of a series of treating devices and a traveling support for the structures, said traveling support consisting of a plurality of endless chains, carriers between the chains, independent suspension devices connected with the carriers, and means for adjusting the suspension devices in such carriers.

In testimony whereof I have signed my name to this specification in the presence of two subscribing witnesses.

JOSEPH T. ROBIN.

Witnesses:
A. J. SOUREIRE,
GEO. E. CRUSE.